United States Patent
Hoshina et al.

(10) Patent No.: US 9,735,417 B2
(45) Date of Patent: Aug. 15, 2017

(54) METHOD OF MANUFACTURING ACTIVE MATERIAL

(71) Applicant: Kabushiki Kaisha Toshiba, Minato-ku (JP)

(72) Inventors: Keigo Hoshina, Yokohama (JP); Yasuhiro Harada, Isehara (JP); Kazuki Ise, Kawasaki (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/066,142

(22) Filed: Mar. 10, 2016

(65) Prior Publication Data

US 2016/0276650 A1    Sep. 22, 2016

(30) Foreign Application Priority Data

Mar. 18, 2015   (JP) ................. 2015-055420

(51) Int. Cl.
  B05D 5/12   (2006.01)
  H01M 4/02   (2006.01)
  (Continued)

(52) U.S. Cl.
  CPC .......... *H01M 4/02* (2013.01); *H01M 4/0471* (2013.01); *H01M 4/131* (2013.01);
  (Continued)

(58) Field of Classification Search
  USPC .............. 427/115, 122, 126.3, 212
  See application file for complete search history.

(56) References Cited

U.S. PATENT DOCUMENTS

2009/0217512 A1   9/2009   Tian et al.
2011/0206991 A1*  8/2011   Nakahara ............... C01B 25/00
                                                  429/231.5
(Continued)

FOREIGN PATENT DOCUMENTS

JP   2010-80188 A    4/2010
JP   2010-287496 A   12/2010
(Continued)

OTHER PUBLICATIONS

Extended European Search Report issued on Jul. 13, 2016 in European Patent Application No. 16158230.9.
(Continued)

*Primary Examiner* — Brian K Talbot
(74) *Attorney, Agent, or Firm* — Oblon, McClelland, Maier & Neustadt, L.L.P.

(57) ABSTRACT

According to an embodiment, a method of manufacturing an active material is provided. The active material includes particles of a composite oxide of the general formula $Ti_{1\pm x}Nb_{2\pm y}M_zO_{7-\delta}$ and a carbon-including phase. Here, $0 \leq x \leq 0.15$, $0 \leq y \leq 0.3$, $0.01 < z \leq 0.2$, and $0 < \delta < 0.3$. M is at least one of Mg, Fe, Ni, Co, W, Ta, and Mo. The manufacturing method includes preparing a mixture by mixing in a liquid, a compound including Ti, a compound including Nb, a carbon source, and a compound including an element M, obtaining a precursor from the mixture, and calcining the precursor. The calcination is performed in a mixed atmosphere including nitrogen and oxygen, or argon and oxygen, with an oxygen concentration of 5% to 15%.

12 Claims, 4 Drawing Sheets

(51) Int. Cl.
  *H01M 4/04*   (2006.01)
  *H01M 4/131*  (2010.01)
  *H01M 4/1391* (2010.01)
  *H01M 4/36*   (2006.01)
  *H01M 4/485*  (2010.01)
  *H01M 4/525*  (2010.01)
  *H01M 4/62*   (2006.01)
  *H01M 10/052*   (2010.01)

(52) U.S. Cl.
  CPC ......... *H01M 4/1391* (2013.01); *H01M 4/366* (2013.01); *H01M 4/485* (2013.01); *H01M 4/525* (2013.01); *H01M 4/625* (2013.01); *H01M 10/052* (2013.01)

(56) References Cited

U.S. PATENT DOCUMENTS

| | | | |
|---|---|---|---|
| 2012/0052401 A1 | 3/2012 | Goodenough et al. | |
| 2012/0107692 A1 | 5/2012 | Harada et al. | |
| 2012/0244442 A1 | 9/2012 | Harada et al. | |
| 2014/0212694 A1* | 7/2014 | Park | H01M 4/366 429/5 |
| 2014/0295231 A1 | 10/2014 | Ise et al. | |
| 2015/0010820 A1* | 1/2015 | Takami | H01M 4/366 429/221 |
| 2015/0056514 A1* | 2/2015 | Dai | H01M 4/485 429/231.5 |
| 2015/0140433 A1* | 5/2015 | Yasuda | H01M 4/364 429/231.1 |
| 2015/0243979 A1* | 8/2015 | Nakahara | C01G 33/00 429/231.1 |

FOREIGN PATENT DOCUMENTS

| | | |
|---|---|---|
| JP | 2012-99287 A | 5/2012 |
| JP | 2012-199146 A | 10/2012 |
| JP | 2013-535787 A | 9/2013 |
| JP | 2014-7120 A | 1/2014 |
| JP | 2014-209445 A | 11/2014 |
| JP | 2015-35420 A | 2/2015 |
| JP | 2016-510304 A | 4/2016 |
| KR | 10-2014-0117273 A | 10/2014 |
| WO | WO 2010/131364 A1 | 11/2010 |

OTHER PUBLICATIONS

Office Action dated Jan. 31, 2017 in Korean Patent Application No. 10-2016-0027551.

Office Action dated Jan. 31, 2017 in Japanese Patent Application No. 2015-055420.

* cited by examiner

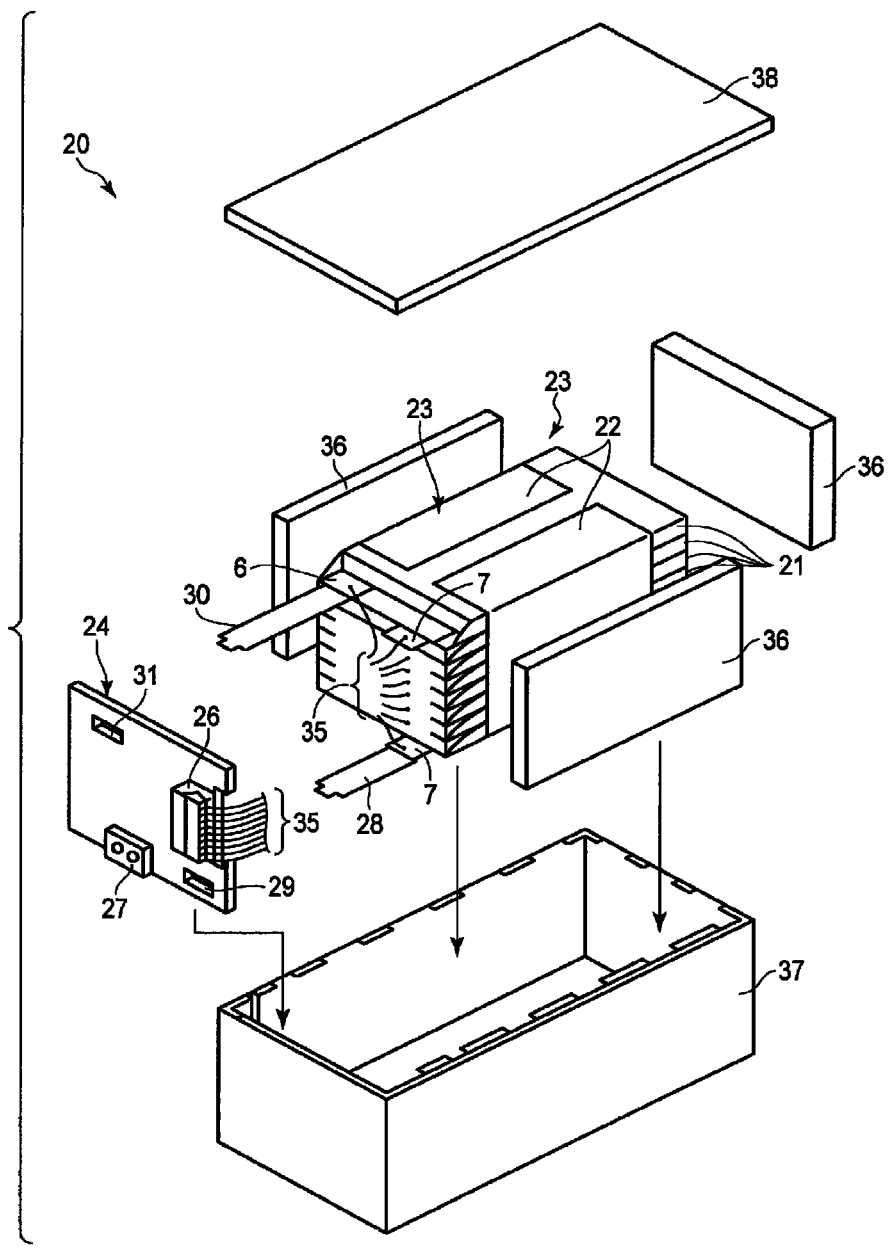
F I G. 5

METHOD OF MANUFACTURING ACTIVE MATERIAL

CROSS-REFERENCE TO RELATED APPLICATION

This application is based upon and claims the benefit of priority from prior Japanese Patent Application No. 2015-055420, filed Mar. 18, 2015, the entire contents of which are incorporated herein by reference.

FIELD

Embodiments described herein relate to a method of manufacturing an active material for batteries.

BACKGROUND

Nonaqueous electrolyte batteries which are charged and discharged based on the movement of lithium ions between a negative electrode and a positive electrode are being extensively investigated and developed as batteries having a high energy density.

In addition to use as small power sources for electronic devices, the nonaqueous electrolyte batteries are expected to be used as medium and large power sources, as well. Lifetime properties and high stability are required for the use of the batteries as medium and large power sources.

As a positive electrode active material for nonaqueous electrolyte batteries, for example, a lithium-transition metal composite oxide is used. For example, Co, Mn or Ni is used as a transition metal. In recent years, spinel type lithium manganese and olivine type compounds such as an olivine type lithium iron phosphate and an olivine type manganese lithium phosphate have been actively researched as a low-cost and safe positive electrode material.

A carbon material is commonly used as a negative electrode material. However, from the viewpoint of lifetime properties and safety, attention is focused on a nonaqueous electrolyte battery manufactured using a titanium oxide material, which has a Li inserting and extracting potential higher than that of a carbon material. Particularly, a spinel type lithium titanium oxide is known as a zero-strain material which does not undergo volume expansion and shrinkage during Li inserting and extracting reactions. Accordingly, a nonaqueous electrolyte battery manufactured using the spinel type lithium titanium oxide is excellent in lifetime properties and safety properties. Further, the nonaqueous electrolyte battery manufactured by using the spinel type lithium titanium oxide is also excellent in rapid charge performance. However, the theoretical capacity per weight of the spinel type lithium titanium oxide is 170 mAh/g, which is lower than that of the carbon material.

Consequently, titanium oxide material having a higher capacity is anticipated. Recently, attention is focused on a titanium and niobium-containing compound $TiNb_2O_7$, whose theoretical capacity is 387 mAh/g, as a high capacity titanium oxide material.

BRIEF DESCRIPTION OF THE DRAWINGS

FIG. 5 is a schematic exploded perspective view of an example of a battery pack that can be realized using an active material for batteries according to an embodiment.

DETAILED DESCRIPTION

Figure 1:
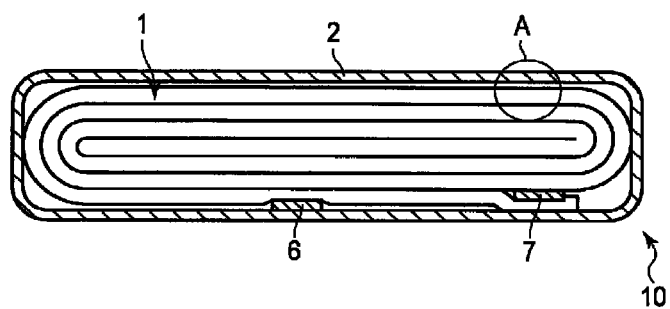
FIG. 1 is a schematic cross-sectional view of an example of a nonaqueous electrolyte battery that can be realized using an active material for batteries that can be obtained by a manufacturing method according to an embodiment.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be appropriately changed taking the following explanations and known technologies into consideration.

EMBODIMENTS

According to an embodiment, a method of manufacturing an active material is provided. The active material includes particles of a composite oxide represented by the general formula $Ti_{1\pm x}Nb_{2\pm y}M_zO_{7-\delta}$ and a carbon-including phase formed on the surface of the particles of composite oxide. In the general formula, each subscript satisfies $0 \le x \le 0.15$, $0 \le y \le 0.3$, $0.01 < z \le 0.2$, and $0 < \delta < 0.3$. M is at least one element selected from the group consisting of Mg, Fe, Ni, Co, W, Ta, and Mo. The manufacturing method according to the embodiment includes preparing a mixture by mixing in a liquid, a compound including Ti, a compound including Nb, a carbon source, and a compound including an element M, obtaining a precursor from the mixture, and calcining the precursor. The precursor includes Ti, Nb, M, C, and O. The calcination of the precursor is performed in a mixed atmosphere including nitrogen and oxygen, or argon and oxygen, with an oxygen concentration of 5% to 15%.

Since the titanium and niobium-containing compound $Ti_2NbO_7$ has low electron conductivity, it is effective to coat the compound with carbon to improve charge and discharge properties. However, Ti and Nb are elements that are easily reduced, and thus, it is difficult to coat the compound $Ti_2NbO_7$ with carbon by calcination in an inert atmosphere. Accordingly, in a common method, Ti and Nb are oxidized to form a crystal of a composite oxide $Ti_2NbO_7$, and then the carbon source and the composite oxide $Ti_2NbO_7$ are mixed. The resulting mixture is calcined in an inert atmosphere, and thus particles of the composite oxide $Ti_2NbO_7$ are coated with carbon. However, this process requires performing of the calcination step twice, which is problematic in that the process is complicated and is costly.

As a result, of intensive study, the present inventors have found a method of manufacturing an active material for batteries according to an embodiment, in which an active material for batteries including particles of a composite oxide represented by the general formula $Ti_{1\pm x}Nb_{2\pm y}M_zO_{7-\delta}$ and a carbon-including phase formed on the surface of the particles can be obtained by performing calcination once. In addition, according to the method of manufacturing an active material for batteries according to the embodiment, an active material for batteries excellent in energy density and rate properties can be provided.

Hereinafter, the method of manufacturing an active material for batteries according to the embodiment will be described in detail.

(Preparation of Mixture)

The method of manufacturing an active material for batteries according to the embodiment includes preparing a mixture by mixing in a liquid, a compound including Ti, a compound including Nb, a carbon source, and a compound including at least one element M selected from the group consisting of Mg, Fe, Ni, Co, W, Ta, and Mo. The element M may be used singly, or in a mixture of plural elements.

By this step of preparing a mixture, a mixture that includes a compound including Ti, a compound including Nb, a carbon source, and a compound including an element M can be obtained.

As the compound including Ti, for example, titanium oxide ($TiO_2$), metatitanic acid ($TiO(OH)_2$), isopropyl titanate ($C_{12}H_{28}O_4Ti$), or titanium chloride ($TiCl_4$) may be used, but the compound is not limited thereto. The compound including Ti may be used singly, or in mixture of plural compounds.

Examples of the compound including Nb include niobium chloride ($NbCl_5$), niobium hydroxide ($Nb(OH)_5$), niobium ammonium oxalate ($C_2H_8N_2O_4.Nb$), and niobium oxide ($Nb_2O_5$), but the compound is not limited thereto. The compound including Nb may be used singly, or in mixture of plural compounds.

As the carbon source, for example sucrose, an organic compound including a COOA group (wherein A is selected from the group consisting of H, Li, and Na), carbon black, ascorbic acid, carboxymethylcellulose, acetylene black, polyvinyl alcohol may be used, but the carbon source is not limited thereto. Examples of the organic compound including a COOA group include carboxymethylcellulose. The carbon source may be used singly, or in mixture of plural carbon sources.

As the compound including at least one element M selected from the group consisting of Mg, Fe, Ni, Co, W, Ta, and Mo, acetates, nitrates, sulfates, chlorides, oxides, and hydroxides, and the like of each element may be used.

The liquid to be used for preparing the mixture may be water, alcohol or a mixture thereof.

The compound including Ti, the compound including Nb, and the compound including an element M are preferably mixed such that, in the mixture, the mole ratio of (Ti+Nb): element M is from 100:1 to 30:1. More preferably, the mole ratio of (Ti+Nb):element M in the mixture is from 80:1 to 50:1.

(Precursor Preparation)

The method of manufacturing an active material for batteries according to the embodiment includes obtaining a precursor from the mixture thus prepared. The precursor to be obtained includes Ti, Nb, M, C, and O.

The step of obtaining a precursor may be performed by, for example, a coprecipitation method, a hydrothermal synthesis method or a sol-gel method. The coprecipitation method, hydrothermal synthesis method, and sol-gel method will be described in detail later.

For example, in the case where the precursor is prepared by the hydrothermal synthesis method, the mixture obtained as described above is placed into an autoclave or the mixing is performed in the autoclave to prepare the mixture. Then, the mixture is heated in the autoclave, for example, at a temperature of from 110° C. to 240° C. to obtain a precursor.

The step of obtaining a precursor may include, for example, drying a mixture that includes a compound including Ti, a compound including Nb, a carbon source, a compound including an element M, and a liquid as a mixing medium. For example, spray drying may be used to dry the mixture.

(Calcination of Precursor)

The manufacturing method according to the embodiment further includes calcining the precursor thus obtained. The calcination of the precursor is performed in a mixed atmosphere of nitrogen and oxygen, or a mixed atmosphere of argon and oxygen. The oxygen concentration of the mixed atmosphere is in a range of from 5% to 15%.

The precursor to be calcined includes a carbon source and an element M, in addition to niobium (Nb) and titanium (Ti). The element M is more likely to be reduced compared to titanium (Ti) and niobium (Nb) and thus can suppress the reduction of titanium (Ti) and niobium (Nb) during calcination in the presence of the carbon source. As a result, in the manufacturing method according to the embodiment, the reduction of titanium (Ti) and niobium (Nb) is suppressed by calcining the precursor in the above manner so that composite oxide particles represented by the general formula $Ti_{1\pm x}Nb_{2\pm y}M_zO_{7-\delta}$ can be obtained. Further, the element M can serve as a carbonization catalyst for carbon source during calcination in a mixed atmosphere with an oxygen concentration of 5% to 15%. As a result, a sufficiently carbonized carbon-including phase is formed on the surface of composite oxide particles. In the manufacturing method according to the embodiment, such an active material for batteries can be obtained by performing calcination once.

On the other hand, when the oxygen concentration in a mixed atmosphere is lower than 5%, even if the element M is included, titanium and niobium are reduced by calcination. Thus, the target composition cannot be obtained. On the other hand, when the oxygen concentration in a mixed atmosphere is higher than 15%, the carbon included in the precursor is converted to carbon dioxide by calcination. Little carbon remains in the resulting calcined product. The oxygen concentration in the mixed atmosphere is preferably in a range of from 7% to 12%, more preferably in a range of from 9% to 11%.

The calcination temperature of the precursor is preferably in a range of from 800° C. to 1000° C., more preferably in a range of from 900° C. to 1000° C.

The element M preferred as a carbonization catalyst for carbon source is Fe, Ni, and W. The element M preferred for suppressing the reduction of titanium (Ti) and niobium (Nb) during calcination in the presence of the carbon source is Ta and Mo.

In the manufacturing method according to the embodiment, compound oxide particles having a sufficiently carbonized carbon-including phase formed thereon can be obtained by performing calcination once. However, the manufacturing method according to the embodiment may include performing the calcining several times. Even if the manufacturing method according to the embodiment includes performing the calcining several times, the method can be performed more easily, as compared to a manufacturing method including: calcining to produce a composite oxide; and calcining to coat with carbon. Further, in the manufacturing method according to the embodiment, a precursor including a carbon source is calcined to produce a composite oxide, and therefore, a sufficiently carbonized carbon-including phase can be formed on the surface of primary particles of the composite oxide. As a result, the active material for batteries obtained by the manufacturing method according to the embodiment has lower resistance than that of the active material for batteries obtained by the manufacturing method including: calcining to produce a composite oxide; and calcining to coat with carbon. As a result, a nonaqueous electrolyte battery having excellent rate properties can be achieved.

Subsequently, some specific examples of the manufacturing method according to the embodiment will be described. However, the manufacturing method according to the embodiment is not limited to the following examples.

(Coprecipitation Method)

The coprecipitation method is a method including: adjusting the pH of a solution including a target metal ion to make the ion concentration in the solution be in an oversaturated state that is higher than the solubility product; and thereby precipitating and depositing the target metal ion as a compound with low solubility (e.g., hydroxide, carbonate, oxalate salt, or sulfate). The precipitate obtained by the coprecipitation method can be used as a precursor to be calcined. The coprecipitation method is generally characterized in that an oxide with high uniformity of elemental composition is obtained and fine particles are easily manufactured.

An example of the manufacturing method according to the embodiment using the coprecipitation method will be specifically described below.

First, a compound including Ti, a compound including Nb, and a compound including an element M are prepared. As the compound including Ti, the compound including Nb, and the compound including an element M to be prepared, highly water-soluble compounds such as metal salts may be used.

These compounds are dissolved in water and mixed. Thus, a mixed solution is obtained. Then, an alkali solution is added to the mixed solution to adjust the pH of the mixed solution to alkaline pH. As a result, a precipitate is formed in the mixed solution.

Next, the carbon source, sucrose for example, is dissolved in the mixed solution. After that, the precipitate is taken out from the mixed solution. The precipitate taken out is washed with water or alcohol and then dried. Thus, a precursor including the precipitate and sucrose attached to at least a part of the surface of the precipitate is obtained.

The thus obtained precursor is calcined. The calcination of the precursor is performed in a mixed atmosphere including nitrogen and oxygen, or including argon and oxygen, with an oxygen concentration of 5% to 15%. In the coprecipitation method, the calcination temperature is preferably in a range of from 800 to 1000° C.

As a result of the calcination, particles of a composite oxide with the target composition including Ti, Nb, and an element M and having a carbon-including phase attached thereto are obtained.

(Hydrothermal Synthesis Method)

The hydrothermal synthesis method is a method including: dissolving a target metal-including compound in water; and synthesizing a compound (ceramics) using water at a high temperature of 100° C. or more and a high pressure as a reaction field. Conditions, such as the kind and concentration of the metal compound as a starting material and the pH of a solution, may be changed to control the shape and crystallinity of the particles of the target compound. It is necessary to use an autoclave as a reactor. The compound obtained by the hydrothermal synthesis method can be used as a precursor to be calcined. The hydrothermal synthesis method is generally characterized in that a highly crystalline compound is obtained by synthesis at a low temperature in a short time and fine particles are easily manufactured.

In the hydrothermal synthesis method, alcohol may also be used as a reaction field.

An example of the manufacturing method according to the embodiment using the hydrothermal synthesis method will be specifically described below.

First, a compound including Ti, a compound including Nb, and a compound including an element M are prepared. As the compound including Ti, the compound including Nb, and the compound including an element M to be prepared, compounds that are highly soluble in the reaction field, water in this example, such as metal salts may be used.

Then, these compounds are dissolved in water and mixed. The mixed solution thus obtained is placed in an autoclave. At this time, the carbon source, sucrose for example, is added to the mixed solution and dissolved. Then, the mixed solution is heated in the autoclave at a temperature of 100° C. or more. The heat treatment temperature is preferably in a range of from 130° C. to 180° C. After the heat treatment, a compound precipitated in the solution is taken out. The compound taken out is washed with water or alcohol and then dried. Thus, a precursor including a precipitate and a sucrose decomposition product attached to at least a part of the surface of the precipitate is obtained.

The thus obtained precursor is calcined. The calcination of the precursor is performed in a mixed atmosphere including nitrogen and oxygen, or including argon and oxygen, with an oxygen concentration of 5% to 15%. In the coprecipitation method, the calcination temperature is preferably in a range of from 800 to 1000° C.

As a result of the calcination, particles of a composite oxide with the target composition including Ti, Nb, and an element M and having a carbon-including phase attached thereto are obtained.

(Sol-Gel Method)

The sol-gel method is a method including: dissolving a target metal-including compound in alcohol or water to prepare a mixed solution; adjusting the mixed solution to acidic or alkaline pH to cause hydrolysis or condensation polymerization; forming a gel-form substance; and heating the gel-form substance to obtain a target compound.

The sol-gel method is generally characterized in that it is easy to control the elemental composition of the target compound, a highly crystalline compound is obtained by synthesis at a lower temperature in a shorter time compared to the solid-phase synthesis method, and fine particles are easily manufactured.

An example of the manufacturing method according to the embodiment using the sol-gel method will be specifically described below.

First, a compound including Ti, a compound including Nb, and a compound including an element M are prepared. As the compound including Ti, the compound including Nb, and the compound including an element M to be prepared, alcohols or highly water-soluble compounds such as metal salts may be used. Among them, alkoxides, sulfates, and acetate are preferred.

Next, these compounds are dissolved in alcohol or water and mixed. Thus, a mixed solution is obtained. As the carbon source, sucrose or the like is added to the resulting mixed solution. The mixed solution thus obtained is subjected to gelling by adjusting the mixed solution to acidic or alkaline pH to thereby cause hydrolysis or condensation polymerization. The resulting gel-form compound is heated and calcined. The heat treatment and calcination are performed in a mixed atmosphere including nitrogen and oxygen, or including argon and oxygen, with an oxygen concentration of 5% to 15%. The heat treatment is preferably performed, for example, at a temperature of 300° C. to 500° C. The heat treatment enables excessive organic compounds to be removed from the gel-form compound. The calcination is preferably performed at a temperature of 800° C. to 1000° C.

After the calcination, particles of a composite oxide with the target composition including Ti, Nb, and an element M and having a carbon-including phase attached thereto are obtained.

[Active Material for Batteries]

According to the manufacturing method according to the embodiment, an active material for batteries including particles of a composite oxide represented by the general formula $Ti_{1\pm x}Nb_{2\pm y}M_zO_{7-\delta}$ and a carbon-including phase formed on the surface of the particles of composite oxide can be obtained. Hereinafter, the active material will be described more in detail.

The active material for batteries obtained by the manufacturing method according to the embodiment include particles of a composite oxide represented by the general formula $Ti_{1\pm x}Nb_{2\pm y}M_zO_{7-\delta}$ and a carbon-including phase formed on the surface of the particles of composite oxide. As described above, the manufacturing method according to the embodiment includes preparing a mixture including a compound including Ti, a compound including Nb, a compound including an element M, and a carbon source. The precursor obtained from the mixture is calcined so that an active material for batteries in which the carbon-including phase is present on the surface of primary particles of composite oxide can be obtained as described above. Further, the element M included in the precursor can serve as a carbonization catalyst for carbon source, as described above. As a result, in the calcining of a precursor included in the manufacturing method according to the embodiment, a sufficiently carbonized carbon-including phase having high conductivity can be formed on the surface of the composite oxide particles. Thus, the active material for batteries obtained by the manufacturing method according to the embodiment has low resistance. As a result, a nonaqueous electrolyte battery having excellent rate properties can be realized.

As described above, during calcination in the presence of the carbon source, the element M can suppress the reduction of titanium (Ti) and niobium (Nb). Thus, the active material for batteries that can be obtained by the manufacturing method according to the embodiment can include Ti ions having a valence close to 4 and Nb ions having a valence close to 5. Accordingly, the active material for batteries that can be obtained by the manufacturing method according to the embodiment can exhibit excellent energy density.

Among the active materials for batteries that can be obtained by the manufacturing method according to the embodiment, an active material for batteries including a composite oxide, wherein the element M is iron (Fe), i.e., a composite oxide represented by the general formula $Ti_{1\pm x}Nb_{2\pm y}Fe_zO_{7-\delta}$, allows realization of a nonaqueous electrolyte battery that can exhibit excellent cycle properties.

An active material for batteries including a composite oxide, where in the element M is molybdenum (Mo) or tantalum (Ta), i.e., a composite oxide represented by the general formula $Ti_{1\pm x}Nb_{2\pm y}Mo_zO_{7-\delta}$ or $Ti_{1\pm x}Nb_{2\pm y}Ta_zO_{7-\delta}$, allows realization of a nonaqueous electrolyte battery that can exhibit excellent rate properties.

The subscripts x, y, and z in the general formula $Ti_{1\pm x}Nb_{2\pm y}M_zO_{7-\delta}$ may depend on, for example, the mixing ratio of the starting materials in the mixture. In the case where the subscript x is larger than 0.15 or the case where the subscript y is a larger than 0.3, a different phase is likely to be formed. In the case where the subscript z is 0.01 or less, the effect of improving energy density and rate properties are low. In the case where the subscript z is larger than 0.2, a different phase is likely to be formed. The subscript x is preferably in a range of from 0 to 0.1. The subscript y is preferably in a range of from 0 to 0.15. The subscript z is preferably in a range of from 0.01 to 0.1.

The subscript $\delta$ in the general formula $Ti_{1\pm x}Nb_{2\pm y}M_zO_{7-\delta}$ represents an oxygen defect level of the composite oxide represented by the general formula. In the case where the subscript $\delta$ is 0.3 or more, the crystal structure becomes unstable and cycle properties are poor. The subscript $\delta$ is preferably in a range of from 0.15 to 0.25.

(Method of Determining Composition of Active Material)

The composition of the active material for batteries can be determined using inductively coupled plasma-atomic emission spectroscopy (ICP-AES). Specifically, the composition can be analyzed by the following procedure. The carbon on the surface of the sample is removed by heating in the atmosphere. The sample without carbon is thermally decomposed using sulfuric acid, nitric acid, perchloric acid, and hydrogen fluoride and then dissolved in dilute nitric acid, thereby making the volume constant. This solution is subjected to quantitative determination for Ti, Nb, and M by means of the ICP-AES. At this time, the sample is assumed to include only O aside from Ti, Nb, and M, and as such, the ratio of Ti, Nb, M, and O is calculated. In the case of measuring from a secondary battery, the secondary battery is disassembled in a draft chamber to obtain an electrode. The resulting electrode layer is scraped off and used as a sample. The sample is thermally decomposed using sulfuric acid, nitric acid, perchloric acid, and hydrogen fluoride and then dissolved in dilute nitric acid, thereby making the volume constant. This solution is subjected to quantitative determination for Ti, Nb, and M by means of the ICP-AES. At this time, the sample is assumed to include only O aside from Ti, Nb, and M, and as such, the ratio of Ti, Nb, M, and O is calculated. The inert gas fusion-infrared insertion method may be used to examine the O concentration.

The active material incorporated into a battery is removed from the battery by the following procedure and subjected to composition analysis.

First, the battery is made to be in a state close to one where lithium ions are completely desorbed from the crystal of the active material. In the case where the active material to be measured is included in the negative electrode, the battery is fully discharged. However, residual lithium ions may be present even in a discharged state.

Next, the battery is disassembled in a glove box filled with argon and the electrode is taken out. The taken out electrode is washed with a suitable solvent and dried under reduced pressure. For example, ethyl methyl carbonate may be used. After the washing and drying process, it is confirmed whether lithium salt is not present on the surface.

The washed electrode body is placed in a suitable solvent and irradiated with an ultrasonic wave. For example, the electrode body is placed in ethyl methyl carbonate in a glass beaker and the beaker is vibrated in an ultrasonic bath so that the electrode layer including an electrode active material can be peeled off from the current collector substrate. Then, the peeled electrode layer is dried under reduced pressure. The resulting electrode layer is ground in a mortar into powder including a target active material, a conductive agent, and a binder. This powder is dissolved in acid to produce a liquid sample including the active material. At this time, hydrochloric acid, nitric acid, sulfuric acid or hydrogen fluoride may be used as the acid. This liquid sample is subjected to the ICP emission spectral analysis as described above and thus the composition of the active material for batteries can be determined.

(Method of Determining Carbon-Including Phase)

The carbon-including phase present on the surface of the active material particles can be determined by the following procedure.

The carbon can be quantified by CHN elemental analysis. In the case of using the active material as a sample, an active material having a carbon-including phase can be used as the sample. The detected carbon component can be quantified as carbon included in the carbon-including phase. In the case that the active material is incorporated into a battery, after removal of the binder by the Soxhlet extraction method, the resulting sample can be measured. In this case, carbon as a conductive agent may be included in the detected carbon.

[Nonaqueous Electrolyte Battery]

Subsequently, the nonaqueous electrolyte battery realized using the active material for batteries that can be obtained by the manufacturing method according to the embodiment will be described.

The nonaqueous electrolyte battery may include, for example, a negative electrode, a positive electrode, and a nonaqueous electrolyte.

The negative electrode may include, for example, a negative electrode current collector and a negative electrode layer formed on the negative electrode current collector.

The negative electrode layer may be formed on either both sides or only one side of the negative electrode current collector. The negative electrode current collector may include a portion in which the negative electrode layer is not formed on the surface thereon. This portion can serve, for example, as a negative electrode tab. Alternatively, the negative electrode current collector may be connected to a negative electrode tab that is a separate entity from the negative electrode current collector As a negative electrode active material, the negative electrode layer may include, for example, the active material for batteries that can be obtained by the manufacturing method according to the embodiment. The negative electrode layer may further include a conductive agent and a binder, as required.

The positive electrode may include, for example, a positive electrode current collector and a positive electrode layer formed on the positive electrode current collector.

The positive electrode layer may be formed on either both sides or only one side of the positive electrode current collector. The positive electrode current collector may include a portion in which the positive electrode layer is not formed on the surface thereon. This portion can serve, for example, as a positive electrode tab. Alternatively, the positive electrode current collector may be connected to a positive electrode tab that is a separate entity from the positive electrode current collector.

The positive electrode layer may include a positive electrode active material. The positive electrode layer may further include a conductive agent and a binder, as required.

The positive electrode and the negative electrode may be configured to form an electrode group. For example, the positive and negative electrodes may be stacked with a separator sandwiched between a negative electrode layer and a positive electrode layer. The electrode group may have a stack type structure formed by stacking plural negative electrodes and plural positive electrodes in the above manner. Alternatively, the electrode group may have a wound type structure obtained by stacking positive and negative electrodes with a separator sandwiched between a negative electrode layer and a positive electrode layer and winding the stacked body.

The nonaqueous electrolyte may be impregnated in the electrode group and retained therein.

The nonaqueous electrolyte battery may further include a container which houses the electrode group and the nonaqueous electrolyte. The container may further include a positive electrode terminal electrically connected to the positive electrode and a negative electrode terminal electrically connected to the negative electrode. The container itself may serve as either the positive electrode terminal or the negative electrode terminal.

Hereinafter, each member to be used for the nonaqueous electrolyte battery will be described in more detail.

(Negative Electrode)

The negative electrode current collector is preferably formed of a material which is electrochemically stable in the potential range higher than 1.0 V (vs. Li/Li$^+$). Examples of the material include an aluminum foil and an aluminum alloy foil including elements such as Mg, Ti, Zn, Mn, Fe, Cu, and Si.

As described above, the negative electrode layer may include as the negative electrode active material, the active material for batteries that can be obtained by the manufacturing method according to the embodiment. The negative electrode layer may further include another negative electrode active material other than the active material for batteries that can be obtained by the manufacturing method according to the embodiment.

As another negative electrode active material, for example a titanium-including oxide such as lithium titanium oxide having a spinel structure ($Li_4Ti_5O_{12}$), a monoclinic β type titanium composite oxide ($TiO_2$ (B)), an anatase type titanium composite oxide ($TiO_2$), or a ramsdellite type lithium titanium oxide ($Li_2Ti_3O_7$) and $Li_2Na_2Ti_6O_{14}$ may be used. Alternatively, a niobium composite oxide may be used. Examples of the niobium composite oxide include $Nb_2O_5$.

The conductive agent that may be included in the negative electrode layer can improve the current collection performance and suppress the contact resistance between the active material and the current collector. Examples of the conductive agent include carbonaceous substances such as acetylene black, carbon black, graphite, carbon nanofiber, and carbon nanotube.

The binder that may be included in the negative electrode layer can bind the active material and the conductive agent to the current collector. Examples of the binder include polytetrafluoroethylene (PTFE), polyvinylidene fluoride (PVdF), and fluorine-based rubber. Other than that, styrene butadiene rubber, carboxymethylcellulose, acrylic resin, polyolefin, polyimide, or the like may be used.

As for the blending ratio of the negative electrode active material, the conductive agent, and the binder in the negative electrode layer, it is preferable that the content of the negative electrode active material is from 70% by mass to 96% by mass, the content of the negative electrode conductive agent is from 2% by mass to 28% by mass, and the content of the binder is from 2% by mass to 28% by mass. When the amount of the conductive agent is less than 2% by mass, the current collection performance of the negative electrode active material layer is lowered and high current properties of the nonaqueous electrolyte battery may be reduced. When the content of the binder is less than 2% by mass, the binding property of the negative electrode active material layer and the negative electrode current collector is lowered and cycle properties may be reduced. On the other hand, from the viewpoint of high capacity performance, the contents of the conductive agent and the binder are preferably 28% by mass or less, each.

The negative electrode can be manufactured by, for example, the following method. First, a negative electrode active material, a conductive agent, and a binder are suspended in a solvent to prepare a slurry. The slurry is applied to one side or both sides of a negative electrode current collector, followed by drying to form a negative electrode layer. The resulting negative electrode layer is pressed to obtain a negative electrode. Alternatively, a pellet can be formed from the negative electrode active material, the conductive agent, and the binder. The pellet can be used as the negative electrode layer.

(Positive Electrode)

The positive electrode current collector is preferably an aluminum foil or an aluminum alloy foil including at least one element selected from Mg, Ti, Zn, Mn, Fe, Cu, and Si. One kind of these elements may be included, or plural kinds of elements may be included.

Examples of the positive electrode active material that may be included in the positive electrode layer include, lithium manganese composite oxide (e.g., $Li_xMn_2O_4$ or $Li_xMnO_2$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}Co_yO_2$), lithium manganese cobalt composite oxide (e.g., $Li_xMn_yCo_{1-y}O_2$), lithium nickel cobalt manganese composite oxide (e.g., $LiNi_{1-y-z}Co_yMn_zO_2$), lithium nickel cobalt aluminum composite oxide (e.g., $LiNi_{1-y-z}Co_yAl_zO_2$), lithium-manganese-nickel composite oxide having a spinel structure (e.g., $Li_xMn_{2-y}Ni_yO_4$), and lithium phosphorus oxide having an olivine structure (e.g., $Li_xFePO_4$, $Li_xMnPO_4$, $Li_xMn_{1-y}Fe_yPO_4$, $Li_xCoPO_4$). In the above formula, it is preferable that $0<x\le1$, $0\le y\le1$, and $0\le z\le1$. As the active material, these compounds may be used singly or plural kinds of these compounds may be used in combination.

Among these, preferred are lithium manganese composite oxide ($Li_xMn_2O_4$), lithium cobalt composite oxide ($Li_xCoO_2$), lithium nickel cobalt composite oxide ($Li_xNi_{1-y}Co_yO_2$), lithium manganese cobalt composite oxide ($Li_xMn_yCo_{1-y}O_2$), lithium nickel cobalt manganese composite oxide (e.g., $LiNi_{1-y-z}Co_yMn_zO_2$), and lithium phosphorus oxide having an olivine structure (e.g., $Li_xFePO_4$, $Li_xMnPO_4$, $Li_xMn_{1-y}Fe_yPO_4$, $Li_xCoPO_4$). In the above formula, it is preferable that $0<x\le1$, $0\le y\le1$, and $0\le z\le1$.

The conductive agent that may be included in the positive electrode layer can improve the current collection performance and suppress the contact resistance between the active material and the current collector. Examples of the conductive agent include carbonaceous substances such as acetylene black, carbon black, graphite, carbon nanofiber, and carbon nanotube.

The binder that may be included in the positive electrode layer can bind the active material and the conductive agent to the current collector. Examples of the binder include polytetrafluoroethylene (PTFE), polyvinylidene fluoride (PVdF), and fluorine-based rubber. Other than that, carboxymethylcellulose, acrylic resin, polyolefin, polyimide, or the like may be used.

Preferably, the positive electrode active material, binder, and conductive agent are blended in proportional amounts of from 80% by mass to 95% by mass, from 3% by mass to 18% by mass, and from 2% by mass to 17% by mass, respectively. When the amount of the conductive agent is set to 3% by mass or more, the above effect can be exerted. When the amount of the conductive agent is set to 18% by mass or less, it is possible reduce the decomposition of the nonaqueous electrolyte on the surface of the conductive agent during storage at high temperatures. When the amount of the conductive agent is set to 2% by mass or more, a sufficient positive electrode strength is obtained. When the amount of the conductive agent is set to 17% by mass or less, the amount of the binder as an insulating material in the positive electrode can be reduced, leading to reduced internal resistance.

The positive electrode can be manufactured by, for example, the following method. First, a positive electrode active material, a conductive agent, and a binder are suspended in a solvent to prepare a slurry. The slurry is applied to one side or both sides of a positive electrode current collector, followed by drying to form a positive electrode layer. The thus obtained positive electrode layer is pressed to from a positive electrode. Alternatively, a pellet can be formed from the positive electrode active material, the conductive agent, and the binder. The pellet can be used as the positive electrode layer.

(Nonaqueous Electrolyte)

As the nonaqueous electrolyte, for example, a liquid nonaqueous electrolyte or gel-form nonaqueous electrolyte can be used. The liquid nonaqueous electrolyte can be prepared by dissolving an electrolyte in an organic solvent. The concentration of the electrolyte is preferably in a range of from 0.5 mol/L to 2.5 mol/L. The gel-form nonaqueous electrolyte can be prepared by forming a composite of a liquid electrolyte and a polymer material.

Examples of the electrolyte include lithium salts of lithium perchlorate ($LiClO_4$), lithium hexafluorophosphate ($LiPF_6$), lithium tetrafluoroborate ($LiBF_4$), lithium hexafluoro arsenate ($LiAsF_6$), lithium trifluoromethanesulfonate ($LiCF_3SO_3$), and bistrifluoromethylsulfonylimidolithium ($LiN(CF_3SO_2)_2$). These electrolytes can be used singly, or two or more kinds can be used in combination. The electrolyte preferably includes $LiPF_6$.

Examples of the organic solvent include cyclic carbonates such as propylene carbonate (PC), ethylene carbonate (EC), and vinylene carbonate; linear carbonates such as diethyl carbonate (DEC), dimethyl carbonate (DMC), and methylethyl carbonate (MEC); cyclic ethers such as tetrahydrofuran (THF), 2-methyltetrahydrofuran (2MeTHF), and dioxolane (DOX); linear ethers such as dimethoxyethane (DME) and diethoxyethane (DEE); γ-butyrolactone (GBL); acetonitrile (AN); and sulfolane (SL). These organic solvents can be used singly, or two or more kinds can be used in combination.

More preferable examples of the organic solvent include a mixed solvent obtained by mixing two or more kinds selected from the group consisting of propylene carbonate (PC), ethylene carbonate (EC), diethyl carbonate (DEC), dimethyl carbonate (DMC), and methylethyl carbonate (MEC), and a mixed solvent including γ-butyrolactone (GBL). The use of such a mixed solvent allows a nonaqueous electrolyte battery having excellent low-temperature properties to be obtained.

Examples of the polymer material include polyvinylidene fluoride (PVdF), polyacrylonitrile (PAN), and polyethylene oxide (PEO).

(Separator)

As the separator, a porous film or a non-woven fabric made of synthetic resin formed of a material such as polyethylene, polypropylene, cellulose or polyvinylidene fluoride (PVdF) may be used. In particular, a porous film formed of polyethylene or polypropylene, melts at a given temperature and can cutoff electric current, and thus it is preferred from the viewpoint of safety improvement. In order to prevent internal short circuit, a separator may be manufactured by coating the porous film or non-woven fabric made of synthetic resin with an inorganic substance such as alumina.

(Container)

As the container, a bag-shaped container formed of a laminate film or a metal container is used.

Examples of the shape include flat-type, square-type, cylindrical-type, coin-type, button-type, sheet-type, stack-type shapes. Of course, in addition to a small battery which is mounted to a portable electronic device, a large battery which is mounted to a two- or four-wheeled vehicle may be suitable.

As the laminate film, a multilayer film including a metal layer and resin films sandwiching the layer can be used. Alternatively, the laminate film may be a multilayer film formed of a metal layer and a resin layer which covers the metal layer. The resin film or the resin layer can serve to reinforce the metal layer.

The metal layer is preferably an aluminum foil or an aluminum alloy foil in order to reduce the weight. As the resin film, a polymer material such as polypropylene (PP), polyethylene (PE), nylon or polyethylene terephthalate (PET) may be used. The laminate film can be molded into the shape of the container by sealing by thermal fusion bonding. The thickness of the laminate film is preferably 0.2 mm or less.

The metal container can be formed from aluminum or an aluminum alloy. The aluminum alloy preferably includes elements such as magnesium, zinc, and silicon. On the other hand, the content of a transition metal such as iron, copper, nickel or chromium is preferably 100 ppm or less. Accordingly, the long-term reliability under a hot environment and heat releasing property can be dramatically improved. The thickness of the metal container is preferably 0.5 mm or less, more preferably 0.2 mm or less.

(Positive Electrode Terminal)

The positive electrode terminal is preferably formed from a material which is electrically stable in a potential range of from 3.0 V to 4.5 V with reference to lithium ion metal and has conductivity. It is preferable that the positive electrode terminal is formed from aluminum or an aluminum alloy including elements such as Mg, Ti, Zn, Mn, Fe, Cu, and Si. The positive electrode terminal is preferably formed from the same material as that of the positive electrode current collector in order to reduce the contact resistance with the positive electrode current collector.

(Negative Electrode Terminal)

The negative electrode terminal is preferably formed from a material which is electrically stable in a potential range of from 1.0 V to 3.0 V with reference to lithium ion metal and has conductivity. It is preferable that the negative electrode terminal is formed from aluminum or an aluminum alloy including elements such as Mg, Ti, Zn, Mn, Fe, Cu, and Si. The negative electrode terminal is preferably formed from the same material as that of the negative electrode current collector in order to reduce the contact resistance with the negative electrode current collector.

Subsequently, specific examples of the above-described nonaqueous electrolyte battery will be described with reference to the drawings.

Figure 2:
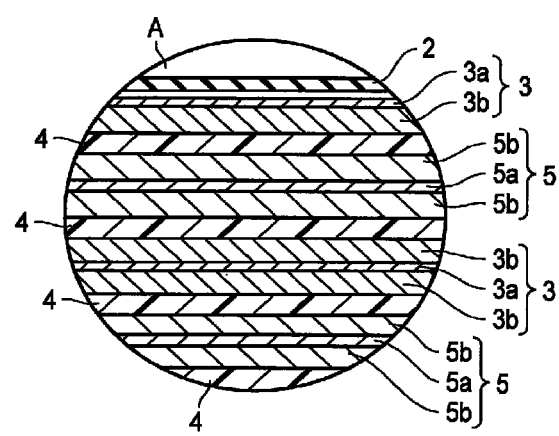
FIG. 2 is an enlarged sectional view of a portion A of the nonaqueous electrolyte battery of FIG. 1.

FIG. 1 is a schematic cross-sectional view of an example of a nonaqueous electrolyte battery that can be realized using an active material for batteries that can be obtained by a manufacturing method according to an embodiment. FIG. 2 is an enlarged sectional view of a portion A of the nonaqueous electrolyte battery of FIG. 1.

A nonaqueous electrolyte battery 10 shown in FIG. 1 and FIG. 2 includes a bag-shaped container 2 shown in FIG. 1, an electrode group 1 shown in FIG. 1 and FIG. 2, and a nonaqueous electrolyte (not shown). The electrode group 1 and the nonaqueous electrolyte are housed in the container 2. The nonaqueous electrolyte is retained in the electrode group 1.

The bag-shaped container 2 is formed of a laminate film including two resin layers and a metal layer disposed in between the two resin layers.

As shown in FIG. 1, the electrode group 1 is a flat-shaped wound electrode group. As shown in FIG. 2, the flat-shaped wound electrode group 1 is formed by spirally winding a laminate obtained by stacking a negative electrode 3, a separator 4, a positive electrode 5, and a separator 4 in this order from the outermost member to obtain a wound product and press-molding the wound product.

The negative electrode 3 includes a negative electrode current collector 3a and a negative electrode layer 3b. The negative electrode layer 3b includes an active material obtained by a method of manufacturing an active material for batteries according to the first embodiment. The negative electrode 3 at the outermost shell has a configuration in which the negative electrode layer 3b is formed on only one side of the internal surface of the negative electrode current collector 3a, as shown in FIG. 2. In other portions of the negative electrodes 3, the negative electrode layer 3b is formed on both surfaces of the negative electrode current collector 3a.

The positive electrode 5 includes a positive electrode current collector 5a and positive electrode layers 5b formed on both surfaces of the positive electrode current collector 5a.

As shown in FIG. 1, in a vicinity of a peripheral edge of the wound electrode group 1, a negative electrode terminal 6 is connected to the negative electrode current collector 3a of the negative electrode 3 at the outermost shell, and a positive electrode terminal 7 is connected to the positive electrode current collector 5a of the inner side positive electrode 5. The negative electrode terminal 6 and the positive electrode terminal 7 are extended to the outside from an opening of the bag-shaped container 2.

The nonaqueous electrolyte battery 10 shown in FIG. 1 and FIG. 2 can be manufactured by, for example, the following procedure. First, an electrode group 1 is manufactured. Next, the electrode group 1 is enclosed within the bag-shaped container 2. Here, one end of each of the negative electrode terminal 6 and the positive electrode terminal 7 is extended outside the container 2. Then, the peripheral edge of the outer case 2 is heat-sealed except for a portion which is left unsealed. Next, a liquid nonaqueous electrolyte, for example, is injected into the bag-shaped container 2 from the non-heat-sealed portion, i.e., the opening of the container 2. Finally, the opening is heat-sealed and thus the wound electrode group 1 and the liquid nonaqueous electrolyte are sealed.

Figure 3:
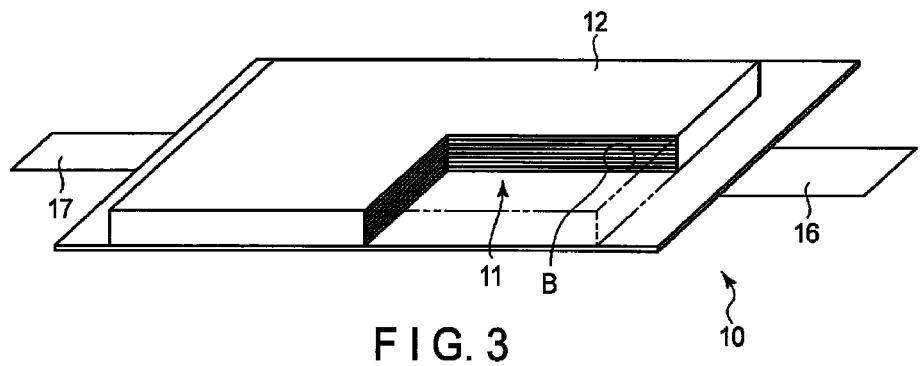
FIG. 3 is a partially-cutout schematic perspective view of another example of a nonaqueous electrolyte battery that can be realized using an active material for batteries that can be obtained by a manufacturing method according to an embodiment.
Figure 4:
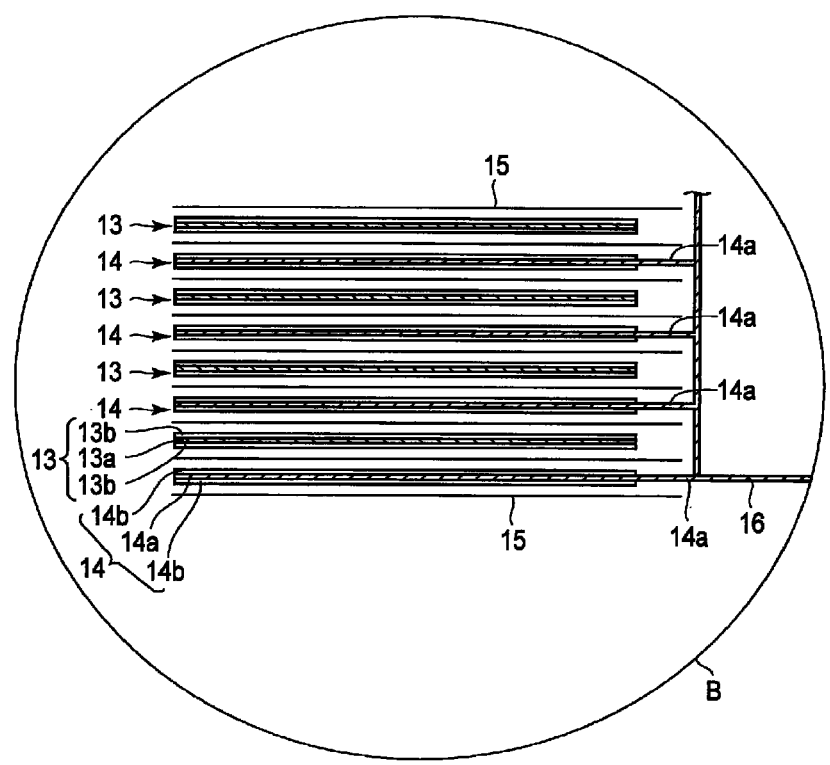
FIG. 4 is an enlarged sectional view of a portion B of the nonaqueous electrolyte battery of FIG. 2.

The nonaqueous electrolyte battery to be achieved using the active material for batteries that can be obtained by the manufacturing method according to the embodiment is not limited to the nonaqueous electrolyte battery exemplified in FIG. 1 or FIG. 2, and may be the battery having the configuration shown in FIG. 3 or FIG. 4.

FIG. 3 is a partially-cutout schematic perspective view of another example of a nonaqueous electrolyte battery that can be realized using an active material for batteries that can be obtained by a manufacturing method according to an embodiment. FIG. 4 is an enlarged sectional view of portion B of FIG. 3.

The nonaqueous electrolyte battery 10 shown in FIG. 3 and FIG. 4 includes an electrode group 11 shown in FIG. 3 and FIG. 4, a container 12 shown in FIG. 3, and a nonaqueous electrolyte (not shown). The electrode group 11 and the nonaqueous electrolyte are housed in the container 12. The nonaqueous electrolyte is retained in the electrode group 11.

The container 12 is formed of a laminate film including two resin layers and a metal layer disposed in between the two resin layers.

As shown in FIG. 4, the electrode group 11 is a stacked electrode group. As shown in FIG. 4, the stack-type electrode group 11 has a structure in which a positive electrode 13 and a negative electrode 14 are alternately stacked while a is formed between the both electrodes.

The electrode group 11 includes plural positive electrodes 13. The positive electrodes 13 each include a positive electrode current collector 13a and a positive electrode layer 13b supported on both surfaces of the positive electrode current collector 13a. The electrode group 11 includes plural negative electrodes 14. The negative electrodes 14 each include a negative electrode current collector 14a and a negative electrode layer 14b supported on both surfaces of the negative electrode current collector 14a. One side of the negative electrode current collector 14a of each of the negative electrodes 14 protrudes from the negative electrode 14. The protruding negative electrode current collectors 14a are electrically connected to a belt-like negative electrode terminal 16. The tip end of the belt-like negative electrode terminal 16 is drawn out to the outside from the container 12. Although not shown, in the positive electrode current collector 13a of each of the positive electrodes 13, a side, which is positioned opposite to the protruding side of the current collectors 14a, protrudes from the positive electrode 13. The current collectors 13a protruding from the positive electrodes 13 are electrically connected to a belt-like positive electrode terminal 17. The tip end of the belt-like positive electrode terminal 17 is located at the opposite side to the negative electrode terminal 16, and drawn out to the outside from the side of the container 12.

The nonaqueous electrolyte battery explained above includes the active material for batteries that can be obtained by the manufacturing method according to the embodiment, and therefore the nonaqueous electrolyte battery can exhibit excellent rate properties.

[Battery Pack]

Subsequently, a battery pack that can be realized using the active material for batteries that can be obtained by the manufacturing method according to the embodiment will be described.

The battery pack can include one or plural nonaqueous electrolyte batteries (unit cells) described above. The plural nonaqueous electrolyte batteries included in the battery pack may be electrically connected in series or in parallel to each other to constitute a battery module. The battery pack may include plural battery modules.

Subsequently, an example of the battery pack will be described in detail with reference to the drawings.

Figure 6:
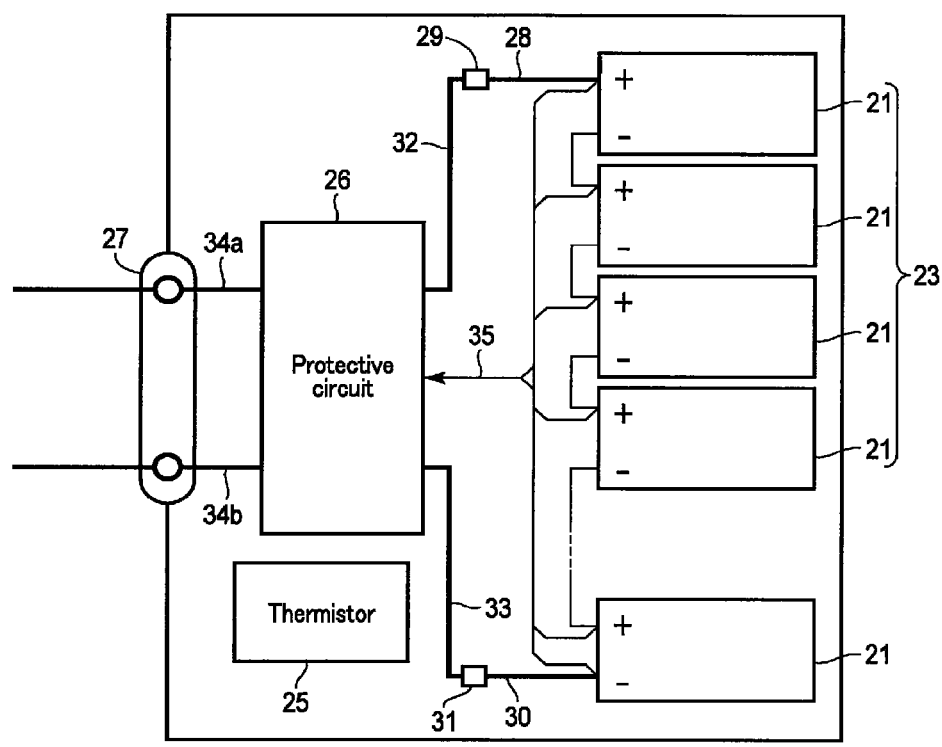
FIG. 6 is a block diagram showing an electric circuit of the battery pack of FIG. 5.

FIG. 5 is a schematic exploded perspective view of an example of a battery pack which can be realized using an active material for batteries according to an embodiment. FIG. 6 is a block diagram showing an electric circuit of the battery pack of FIG. 5.

A battery pack 20 shown in FIG. 5 or FIG. 6 includes plural unit cells 21. The unit cells 21 may be, for example, the flat-shaped nonaqueous electrolyte battery 10 which have been described with reference to FIGS. 1 and 2.

A battery module 23 is configured by stacking the unit cells 21 so that a negative electrode terminal 6 and a positive electrode terminal 7 extended outside are arranged in the same direction and fastening them with an adhesive tape 22. The unit cells 21 are electrically connected in series with one another as shown in FIG. 6.

A printed wiring board 24 is arranged facing opposite to the side surface of the battery module 23 from where the negative electrode terminal 6 and the positive electrode terminal 7 extend out. A thermistor 25, a protective circuit 26, and an energizing terminal 27 to an external device are mounted on the printed wiring board 24 as shown in FIG. 6. An electric insulating plate (not shown) is attached to the plane of the printed wiring board 24 facing the battery module 23 to avoid unnecessary connection of the wiring of the battery module 23.

A positive electrode-side lead 28 is connected to the positive electrode terminal 7 located at the bottom layer of the battery module 23 and the distal end of the lead 28 is inserted into a positive electrode-side connector 29 of the printed wiring board 24 so as to be electrically connected. A negative electrode-side lead 30 is connected to the negative electrode terminal 6 located at the top layer of the battery module 23 and the distal end of the lead 30 is inserted into an negative electrode-side connector 31 of the printed wiring board 24 so as to be electrically connected. The connectors 29 and 31 are connected to the protective circuit 26 through wirings 32 and 33 formed in the printed wiring board 24.

The thermistor 25 detects the temperature of the unit cells 21 and the detection signal is sent to the protective circuit 26. The protective circuit 26 can shut down a plus-side wiring 34a and a minus-side wiring 34b between the protective circuit 26 and the energizing terminal 27 to an external device under a predetermined condition. An example of the predetermined condition indicates when the detection temperature of the thermistor 25 becomes a predetermined temperature or more. Another example of the predetermined condition indicates when the over-charge, over-discharge, and over-current of the unit cells 21 are detected. The over-charge detection is performed on each of the unit cells 21 or the whole of the battery module 23. When each of the unit cells 21 is detected, the cell voltage may be detected, or positive electrode or negative electrode potential may be detected. In the latter case, a lithium electrode to be used as a reference electrode is inserted into each of the unit cells 21. In the case of the battery pack 20 shown in FIG. 5 or FIG. 6, wirings 35 for voltage detection are connected to the unit cells 21, and detection signals are sent to the protective circuit 26 through the wirings 35.

Protective sheets 36 consisting of rubber or resin are arranged on three side planes of the battery module 23 except the side plane from which the positive electrode terminal 7 and the negative electrode terminal 6 protrude out.

The battery module 23 is housed in a housing container 37 together with each of the protective sheets 36 and the printed wiring board 24. That is, the protective sheets 36 are arranged along both internal surfaces in a long side direction of the housing container 37 and along one internal surface in a short side direction. The printed wiring board 24 is arranged along the other internal surface in a short side direction. The battery module 23 is located in a space surrounded by the protective sheets 36 and the printed wiring board 24. A lid 38 is attached to the upper surface of the housing container 37.

In order to fix the battery module 23, a heat-shrinkable tape may be used in place of the adhesive tape 22. In this case, the battery module is bound by placing the protective sheets on the both sides of the battery module, revolving the heat-shrinkable tape, and thermally shrinking the heat-shrinkable tape.

In FIGS. 5 and 6, the structure in which the unit cells 21 are connected in series is shown. In order to increase the battery capacity, the unit cells may be connected in parallel. Alternatively, connecting in series and connecting in parallel may be combined. Furthermore, an assembled battery pack can be connected in series or in parallel.

The aspect of the battery pack may be appropriately changed depending on its application. The above-described battery pack is used suitably for the application which requires excellent cycle properties when large current is taken out. Specifically, the battery pack is used as a power source for digital cameras, as a battery for mounting on vehicles such as two- or four-wheel hybrid electric vehicles, two- or four-wheel electric vehicles, and assisted bicycles. In particular, the battery pack is suitably used as a battery for mounting on vehicles.

The above-described battery pack includes the active material for batteries that can be obtained by the manufacturing method according to the embodiment, and thus, it can exhibit excellent rate properties.

According to an embodiment, there is provided a method of manufacturing an active material for batteries that includes particles of a composite oxide represented by the general formula $Ti_{1\pm x}Nb_{2\pm y}M_zO_{7-\delta}$ and a carbon-including phase formed on the surface of the particles of composite oxide. The manufacturing method according to the embodiment includes preparing a mixture by mixing in a liquid, a compound including Ti, a compound including Nb, a carbon source, and a compound including an element M, obtaining a precursor from the mixture, and calcining the precursor. The precursor includes Ti, Nb, M, C, and O. The calcination of the precursor is performed in a mixed atmosphere including nitrogen and oxygen, or argon and oxygen, with an oxygen concentration of 5% to 15%. In the manufacturing method according to the embodiment, it is possible to produce an active material for batteries including particles of composite oxide $Ti_2NbO_7$ coated with carbon while suppressing the reduction of titanium (Ti) and niobium (Nb) by performing calcination once.

EXAMPLES

Hereinafter, examples will be described. However, the present invention is not limited to the following examples unless departing from the spirit of the present invention.

Example 1

In Example 1, a product of Example 1 was prepared by the procedure described below.

First, titanyl sulfate ($TiOSO_4$), niobium chloride ($NbCl_5$), ascorbic acid ($C_6H_8O_6$), and iron sulfate heptahydrate ($FeSO_4 \cdot 7H_2O$) were prepared as starting materials. Titanyl sulfate was used as a dilute sulfuric acid solution and niobium chloride was dissolved in ethanol. These starting materials were mixed to have a mixing ratio of 1:10 (water: ethanol=1:10 (volume ratio)) and a mixed solution was obtained. In this case, the mole ratio of titanium (Ti), niobium (Nb), and iron (Fe) in the mixed solution was as follows: Ti:Nb:Fe=0.9:2.05:0.05. Ascorbic acid was added in an amount such that 5% by weight of carbon would remain in respect to the total weight of the active material after carbonization.

Then, the mixed solution was placed in an autoclave and heated at 200° C. for 1 hour in the atmosphere. As a result of the heat treatment, a precipitate including titanium (Ti), niobium (Nb), and iron (Fe) was precipitated in the mixed solution. This precipitate was taken out and washed with water. After that, the precipitate was dried. Thus, a precursor was obtained.

Then, the obtained precursor was calcined at 900° C. for 2 hours in an atmosphere with an oxygen concentration of 10%. The resulting calcined product was ground in a mortar. The ground product was designated as a product of Example 1.

Example 2

In Example 2, a product of Example 2 was prepared by the procedure described below.

First, isopropyl titanate ($Ti\{OCH(CH_3)_2\}_4$), niobium ammonium oxalate hydrate ($C_4H_4NNbO_9 \cdot xH_2O$), ascorbic acid, and iron sulfate heptahydrate were prepared as starting materials. These starting materials were dissolved in a mixed solvent of water and propanol (water:propanol=1:40 (volume ratio)) and a mixed solution was obtained. In this case, the mole ratio of titanium (Ti), niobium (Nb), and iron (Fe) in the mixed solution was as follows: Ti:Nb:Fe=0.9:2.05:0.05. Ascorbic acid was added in an amount such that 5% by weight of carbon would remain in respect to the total weight of the active material after carbonization.

The obtained mixed solution of the starting materials was sufficiently mixed and the solvent was dried to obtain a precursor. This precursor was heated at 400° C. for 1 hour in an atmosphere with an oxygen concentration of 10%.

Then, the obtained precursor was calcined at 900° C. for 2 hours in an atmosphere with an oxygen concentration of 10%. The resulting calcined product was ground in a mortar. The ground product was designated as a product of Example 2.

Example 3

In Example 3, a product of Example 3 was prepared by the procedure described below.

First, titanyl sulfate, niobium chloride, ascorbic acid, and iron sulfate heptahydrate were prepared as starting materials. These starting materials were dissolved in a mixed solvent of water and ethanol (water:ethanol=1:20 (volume ratio)). In this case, the mole ratio of titanium (Ti), niobium (Nb), and iron (Fe) in the mixed solution was as follows: Ti:Nb:Fe=0.9:2.05:0.05. Ascorbic acid was added in an amount such that 5% by weight of carbon would remain in respect to the total weight of the active material after carbonization.

Then, an ammonia solution was added to the mixed solution to adjust the pH of the mixed solution to 10. The addition of the ammonia solution resulted in precipitation of a precipitate including Ti, Nb, and Fe. The precipitate was taken out and dried. Thus, a precursor was obtained.

The obtained precursor was calcined at 900° C. for 2 hours in an atmosphere with an oxygen concentration of 10%. The resulting calcined product was ground in a mortar. The ground product was designated as a product of Example 3.

Comparative Example 1

In Comparative example 1, a product of Comparative example 1 was prepared by the procedure described below.

First, titanium oxide ($TiO_2$), niobium oxide ($Nb_2O_5$), and iron oxide ($Fe_2O_3$) were prepared as starting materials. These starting materials were mixed in a mortar to obtain a mixture. In this case, the mole ratio of titanium (Ti), niobium (Nb), and iron (Fe) in the mixture was as follows: Ti:Nb:Fe=0.9:2.05:0.05.

The obtained mixture was calcined at 900° C. for 2 hours in the air. The resulting heated product was ground in a mortar. Some of the ground product was subjected to composition analysis by ICP-AES based on the procedure described above. As a result, it is found that the ground product has the composition $Ti_{0.9}Nb_{2.05}Fe_{0.05}O_{6.97}$.

10 g of powder of the thus obtained composite oxide ($Ti_{0.9}Nb_{2.05}Fe_{0.05}O_{6.97}$) was weighed, which was added to a sucrose solution obtained by adding sucrose in an amount such that 5% by weight of carbon would remain in respect to the total weight of the active material after carbonization. Thus, a mixed solution was obtained.

Then, the solvent in the mixed solution was dried to obtain a precursor. After that, the obtained precursor was calcined at 900° C. for 2 hours in an argon atmosphere (oxygen concentration: 0%). The resulting calcined product was again ground in the mortar. The ground product was designated as a product of Comparative example 1.

Examples 4 and 5 and Comparative Examples 2 and 3

In Examples 4 and 5 as well as Comparative examples 2 and 3, products of Examples 4 and 5 as well as Comparative examples 2 and 3 were prepared in the same manner as Example 1 except for the calcination conditions of the precursor.

In Example 4, the calcination of the precursor was performed in an atmosphere with an oxygen concentration of 15%. In Example 5, the calcination of the precursor was performed in an atmosphere with an oxygen concentration of 5%. In Comparative example 2, the calcination of the precursor was performed in an atmosphere with an oxygen concentration of 3%. In Comparative example 3, the calcination of the precursor was performed in an atmosphere with an oxygen concentration of 18%.

Example 6

In Example 6, a product of Example 6 was prepared in the same manner as Example 1 except for the following points.

In Example 6, the mole ratio of titanium (Ti), niobium (Nb), and iron (Fe) in a mixed solution of starting materials was as follows: Ti:Nb:Fe=0.85:2.3:0.2.

Example 7

In Example 7, a product of Example 7 was prepared in the same manner as Example 1 except for the following points.

In Example 7, as a starting material, nickel sulfate hexahydrate ($NiSO_4 \cdot 6H_2O$) was used in place of iron sulfate heptahydrate. In Example 7, the mole ratio of titanium (Ti), niobium (Nb), and nickel (Ni) in a mixed solution of starting materials was as follows: Ti:Nb:Ni=1:2:0.05.

Example 8

In Example 8, a product of Example 8 was prepared in the same manner as Example 1 except for the following points.

In Example 8, as a starting material, nickel sulfate hexahydrate was used in place of iron sulfate heptahydrate. Example 8 was the same as Example 1 except that the mole ratio of titanium (Ti), niobium (Nb), and nickel (Ni) in a mixed solution of starting materials was as follows: Ti:Nb:Ni=1:2:0.01.

Example 9

In Example 9, a product of Example 9 was prepared in the same manner as Example 1 except for the following points.

In Example 9, as a starting material, cobalt acetate tetrahydrate ($Co(CH_3COO)_2 \cdot 4H_2O$) was used in place of iron sulfate heptahydrate. In Example 9, the mole ratio of titanium (Ti), niobium (Nb), and cobalt (Co) in a mixed solution of starting materials was as follows: Ti:Nb:Co=1:2:0.05.

Example 10

In Example 10, a product of Example 10 was prepared in the same manner as Example 1 except for the following points.

In Example 10, as a starting material, magnesium sulfate heptahydrate ($MgSO_4 \cdot 7H_2O$) was used in place of iron sulfate heptahydrate. In Example 10, the mole ratio of titanium (Ti), niobium (Nb), and magnesium (Mg) in a mixed solution of starting materials was as follows: Ti:Nb:Mg=1:2:0.2.

Example 11

In Example 11, a product of Example 11 was prepared in the same manner as Example 1 except for the following points.

In Example 11, as a starting material, tungsten oxide ($WO_3$) was used in place of iron sulfate heptahydrate. In Example 11, the mole ratio of titanium (Ti), niobium (Nb), and tungsten (W) in a mixed solution of starting materials was as follows: Ti:Nb:W=1:2:0.01.

Example 12

In Example 12, a product of Example 12 was prepared in the same manner as Example 1 except for the following points.

In Example 12, as a starting material, tantalum oxide ($Ta_2O_5$) was used in place of iron sulfate heptahydrate. In Example 12, the mole ratio of titanium (Ti), niobium (Nb), and tantalum (Ta) in a mixed solution of starting materials was as follows: Ti:Nb:Ta=1:1.9:0.1.

Example 13

In Example 13, a product of Example 13 was prepared in the same manner as Example 1 except for the following points.

In Example 13, as a starting material, molybdenum oxide ($MoO_3$) was used in place of iron sulfate heptahydrate. In Example 13, the mole ratio of titanium (Ti), niobium (Nb), and molybdenum (Mo) in a mixed solution of starting materials was as follows: Ti:Nb:No=1.15:1.7:0.15.

Example 14

In Example 14, a product of Example 14 was prepared in the same manner as Example 13 except that the mixing ratio of the starting materials was changed as follows.

In Example 14, the mole ratio of titanium (Ti), niobium (Nb), and molybdenum (Mo) in a mixed solution of starting materials was as follows: Ti:Nb:Mo=1.15:1.8:0.1.

Examples 15 to 17

In Examples 15 to 17, products of Examples 15 to 17 were prepared in the same manner as Example 1 except that, as a carbon source, another carbon source was used in place of ascorbic acid.

In Example 15, sucrose was used as the carbon source. Sucrose was added in an amount such that 5% by weight of carbon would remain in respect to the total weight of the active material after carbonization.

In Example 16, carboxymethylcellulose was used as the carbon source. Carboxymethylcellulose was added in an amount such that 5% by weight of carbon would remain in respect to the total weight of the active material after carbonization.

In Example 17, acetylene black was used as the carbon source. Acetylene black was added in an amount such that the concentration of acetylene black in the mixed solution of starting materials was equal to 5% by weight of carbon in respect to the total weight of the active material.

Example 18

In Example 18, a product of Example 18 was prepared by the procedure described below.

First, titanium oxide, niobium hydroxide, sucrose, and nickel sulfate hexahydrate were prepared as starting materials. These starting materials were dissolved in a mixed solvent of water and ethanol (water:ethanol=1:1 (volume ratio)) and a mixed solution was obtained. In this case, the mole ratio of titanium (Ti), niobium (Nb), and iron (Fe) in the mixed solution was as follows: Ti:Nb:Ni=1:2:0.05. Sucrose was added in an amount such that 5% by weight of carbon would remain in respect to the total weight of the active material after carbonization.

The obtained mixed solution of the starting materials was sufficiently mixed and the solvent was dried to obtain a precursor. This precursor was heated at 400° C. for 1 hour in an atmosphere with an oxygen concentration of 10%.

The obtained precursor was calcined at 900° C. for 2 hours in an atmosphere with an oxygen concentration of 10%. The resulting calcined product was ground in a mortar. The ground product was designated as a product of Example 18.

Example 19

In Example 19, a product of Example 19 was prepared by the procedure described below.

First, titanium chloride, niobium ammonium oxalate, polyvinyl alcohol, and iron sulfate heptahydrate were prepared as starting materials. These starting materials were dissolved in a mixed solvent of water and propanol (water:propanol=1:20 (volume ratio)) and a mixed solution was obtained. In this case, the mole ratio of titanium (Ti), niobium (Nb), and iron (Fe) in the mixed solution was as follows: Ti:Nb:Fe=1:2:0.05. Polyvinyl alcohol was added in an amount such that 5% by weight of carbon would remain in respect to the total weight of the active material after carbonization.

The obtained mixed solution of the starting materials was sufficiently mixed and the solvent was dried to obtain a precursor. This precursor was heated at 400° C. for 1 hour in an atmosphere with an oxygen concentration of 10%.

The obtained precursor was calcined at 900° C. for 2 hours in an atmosphere with an oxygen concentration of 10%. The resulting calcined product was ground in a mortar. The ground product was designated as a product of Example 19.

Comparative Example 4

In Comparative example 4, a product of Comparative example 4 was prepared in the same manner as Example 1 except that iron sulfate heptahydrate was not used as a starting material.

Comparative Example 5

In Comparative example 5, a product of Comparative example 5 was prepared in the same manner as Example 1 except that ascorbic acid was not used as a starting material.

[Analysis and Evaluation]

(Composition Analysis and Confirmation of Carbon-Including Phase)

Some of the products of Examples 1 to 19 and some of the products of Comparative examples 1 to 5 were subjected to composition analysis by ICP-AES based on the procedure described above. The results are shown in Table 1 below.

Some of the products of Examples 1 to 19 and some of the products of Comparative examples 1 to 5 were used to confirm whether the carbon-including phase was present on the surface of the particles of the products based on the procedure described above. The results are shown in Table 1 below.

TABLE 1

|  | Precursor Preparation Method | Oxygen Concentration of Sintering Atmosphere | Composition of Product | Presence of carbon-including phase |
|---|---|---|---|---|
| Example 1 | hydrothermal synthesis method | 10% | $Ti_{0.9}Nb_{2.05}Fe_{0.05}O_{6.8}$ | present |
| Example 2 | sol-gel method | 10% | $Ti_{0.9}Nb_{2.05}Fe_{0.05}O_{6.8}$ | present |
| Example 3 | coprecipitation method | 10% | $Ti_{0.9}Nb_{2.05}Fe_{0.05}O_{6.8}$ | present |
| Example 4 | hydrothermal synthesis method | 15% | $Ti_{0.9}Nb_{2.05}Fe_{0.05}O_{6.83}$ | present |
| Example 5 | hydrothermal synthesis method | 5% | $Ti_{0.9}Nb_{2.05}Fe_{0.05}O_{6.75}$ | present |

TABLE 1-continued

|  | Precursor Preparation Method | Oxygen Concentration of Sintering Atmosphere | Composition of Product | Presence of carbon-including phase |
|---|---|---|---|---|
| Example 6 | hydrothermal synthesis method | 10% | $Ti_{0.85}Nb_{2.3}Fe_{0.2}O_{6.8}$ | present |
| Example 7 | hydrothermal synthesis method | 10% | $TiNb_2Ni_{0.05}O_{6.8}$ | present |
| Example 8 | hydrothermal synthesis method | 10% | $TiNb_2Ni_{0.01}O_{6.8}$ | present |
| Example 9 | hydrothermal synthesis method | 10% | $TiNb_2Co_{0.05}O_{6.8}$ | present |
| Example 10 | hydrothermal synthesis method | 10% | $TiNb_2Mg_{0.2}O_{6.8}$ | present |
| Example 11 | hydrothermal synthesis method | 10% | $TiNb_2W_{0.01}O_{6.8}$ | present |
| Example 12 | hydrothermal synthesis method | 10% | $TiNb_{1.9}Ta_{0.1}O_{6.8}$ | present |
| Example 13 | hydrothermal synthesis method | 10% | $Ti_{1.15}Nb_{1.7}Mo_{0.15}O_{6.8}$ | present |
| Example 14 | hydrothermal synthesis method | 10% | $Ti_{1.15}Nb_{1.8}Mo_{0.1}O_{6.8}$ | present |
| Example 15 | hydrothermal synthesis method | 10% | $Ti_{0.9}Nb_{2.05}Fe_{0.05}O_{6.8}$ | present |
| Example 16 | hydrothermal synthesis method | 10% | $Ti_{0.9}Nb_{2.05}Fe_{0.05}O_{6.8}$ | present |
| Example 17 | hydrothermal synthesis method | 10% | $Ti_{0.9}Nb_{2.05}Fe_{0.05}O_{6.8}$ | present |
| Example 18 | sol-gel method | 10% | $TiNb_2Ni_{0.05}O_{6.8}$ | present |
| Example 19 | sol-gel method | 10% | $TiNb_2Fe_{0.05}O_{6.8}$ | present |
| Comparative Example 1 | solid-phase method (calcining twice) | 0% (Argon atmosphere) | $Ti_{0.9}Nb_{2.05}Fe_{0.05}O_{6.97}$ | present |
| Comparative Example 2 | hydrothermal synthesis method | 3% | $Ti_{0.9}Nb_{2.05}Fe_{0.05}O_{6.6}$ | present |
| Comparative Example 3 | hydrothermal synthesis method | 18% | $Ti_{0.9}Nb_{2.05}Fe_{0.05}O_{6.9}$ | not present |
| Comparative Example 4 | hydrothermal synthesis method (no compound including M) | 10% | $Ti_{0.9}Nb_{2.05}O_{6.8}$ | present |
| Comparative Example 5 | hydrothermal synthesis method (no carbon source) | 10% | $Ti_{0.9}Nb_{2.05}Fe_{0.05}O_{6.7}$ | not present |

(Evaluation of Battery Properties)

<Manufacturing of Evaluation Cell>

A slurry was prepared by mixing the product of Example 1, acetylene black, and polyvinylidene fluoride (PVdF) at a mass ratio of 80:10:10 in N-methyl pyrrolidone. The slurry was applied at a density of 50 g/m² onto an Al foil and dried. The dried electrode was pressed and further dried under vacuum. Thus, a test electrode of Example 1 was obtained.

Next, in a dry argon atmosphere, the test electrode of Example 1 was disposed to face against Li metal as a counter electrode through a glass filter (separator). As a reference electrode, a lithium metal was inserted so as not to be in contact with the test electrode of Example 1 and the Li metal of the counter electrode. These members were placed in a three-electrode glass cell. Each of the test electrode of Example 1, the counter electrode, and the reference electrode was connected to a terminal of the glass cell.

On the other hand, the nonaqueous electrolyte was prepared by the following procedure. First, a mixed solvent was prepared by mixing ethylene carbonate (EC) and diethyl carbonate (DEC) at a volume ratio of 1:2. As an electrolyte, 1.0 mol/L of $LiPF_6$ was dissolved in the mixed solvent. Thus, a nonaqueous electrolyte was prepared.

The nonaqueous electrolyte thus prepared was poured into the above glass cell. After pouring in the nonaqueous electrolyte, the glass container was sealed in a state where the separator and the electrode were sufficiently impregnated with the electrolyte solution. Thus, an evaluation cell of Example 1 was assembled.

Evaluation cells of Examples 2 to 19 and Comparative examples 1 to 5 were fabricated in the same manner as the evaluation cell of Example 1 except that the products of Examples 2 to 19 and the products of Comparative examples 1 to 5 were used, respectively.

<Charge-Discharge Test of Evaluation Cell>

Charge-discharge test was performed using the evaluation cell of Example 1 in an environment of 25° C. The unit "mA/g" of the rate used hereinafter means a current value per weight of the active material.

The cell was charged at a constant current and a constant voltage. The charging rate was 25 mA/g, and the voltage was a constant voltage of 1.0 V (vs. Li/Li$^+$). The charging time was 15 hours.

Then, the evaluation cell of Example 1 was discharged at a constant current. The discharge rate was 25 mA/g. The discharging was terminated when the potential of the test electrode reached 3.0 V (vs. Li/Li$^+$). The capacity per weight discharged in the discharge process was defined as a discharge capacity at a discharge rate of 25 mA/g.

Then, the evaluation cell of Example 1 was charged under the same conditions as described above. After that, the evaluation cell of Example 1 was discharged at a constant current. In this discharge process, the discharge rate was 250 mA/g. The discharging was terminated when the potential of the test electrode reached 3.0 V (vs. Li/Li$^+$). The capacity per weight discharged in the discharge process was defined as a discharge capacity at a discharge rate of 250 mA/g.

<Charge and Discharge Cycle Test of Evaluation Cell>

Subsequently, the evaluation cell of Example 1 was subjected to charge and discharge cycle test by the following procedure.

The evaluation cell was charged at a constant current and a constant voltage. Here, the amount of current was 250 mA/g and the charge voltage was 1.0 V. The evaluation cell was discharged at a constant current. The amount of current was 250 mA/g. The terminal discharge voltage was 3.0 V. Having a cycle of such charge and discharge count as one cycle, the charge and discharge cycle was repeated 50 times.

[Results]

The battery properties of the evaluation cells of Examples 2 to 19 and Comparative examples 1 to 5 were evaluated in the same manner as the evaluation cell of Example 1. The evaluation results of the evaluation cells of Examples 1 to 19 and Comparative examples 1 to 5 are shown in Table 2 below.

sis method, the sol-gel method, and the coprecipitation method. The results in Tables 1 and 2 indicate that although the precursors are obtained by different methods in Examples 1 to 3, the evaluation cells of Examples 1 to 3 similarly exhibit rate properties superior to those of the evaluation cell of Comparative example 1.

Examples 1, 4, and 5 and Comparative examples 2 and 3 are examples where oxygen concentrations in the calcination atmosphere were made different from one another. The results in Table 2 indicate that the evaluation cells manufactured by using the products of Examples 1, 4, and 5 obtained by performing calcination in an atmosphere with an oxygen concentration of 5% to 15% have a discharge capacity higher than that of the evaluation cell manufactured by using the product of Comparative example 2 obtained by performing calcination in an atmosphere with an oxygen concentration of 3%. This is considered due to the fact that in Comparative Example 2, the calcination was performed in an atmosphere with an oxygen concentration that was too low ad therefore likely to cause reduction of Ti and/or Nb, and thus a phase in which Ti or Nb had been reduced had formed during the calcination of the precursor.

TABLE 2

| | Discharge Capacity at Discharge Rate of 25 mA/g | Discharge Capacity at Discharge Rate of 250 mA/g | 50 Cycles Capacity Retention Rate | Rate Capacity Retention Rate |
|---|---|---|---|---|
| Example 1 | 263 | 251 | 82 | 95.4% |
| Example 2 | 255 | 247 | 80 | 96.9% |
| Example 3 | 266 | 255 | 84 | 95.9% |
| Example 4 | 260 | 241 | 83 | 92.7% |
| Example 5 | 252 | 238 | 77 | 94.4% |
| Example 6 | 258 | 243 | 78 | 94.2% |
| Example 7 | 259 | 241 | 77 | 93.1% |
| Example 8 | 260 | 245 | 80 | 94.2% |
| Example 9 | 252 | 239 | 75 | 94.8% |
| Example 10 | 253 | 238 | 77 | 94.1% |
| Example 11 | 258 | 247 | 80 | 95.7% |
| Example 12 | 264 | 253 | 84 | 95.8% |
| Example 13 | 262 | 250 | 85 | 95.4% |
| Example 14 | 261 | 244 | 81 | 93.5% |
| Example 15 | 256 | 242 | 87 | 94.5% |
| Example 16 | 258 | 244 | 83 | 94.6% |
| Example 17 | 258 | 241 | 80 | 93.4% |
| Example 18 | 264 | 250 | 84 | 94.7% |
| Example 19 | 260 | 246 | 73 | 94.6% |
| Comparative Example 1 | 260 | 241 | 78 | 92.7% |
| Comparative Example 2 | 249 | 232 | 66 | 93.2% |
| Comparative Example 3 | 255 | 230 | 62 | 90.2% |
| Comparative Example 4 | 250 | 235 | 73 | 94.0% |
| Comparative Example 5 | 253 | 231 | 52 | 91.3% |

The results in Table 1 indicate that in Examples 1 to 5, active materials including particles of composite oxide having the target composition $Ti_{0.9}Nb_{2.05}Fe_{0.05}O_{7-\delta}$ and a carbon-including phase formed on the surface of the particles was manufactured. The results in Table 2 indicate that the evaluation cells of Examples 1 to 5 manufactured by using the products obtained in Examples 1 to 5 have rate properties superior to those of the evaluation cell of Comparative example 1 manufactured by using the product of Comparative example 1, which has the same composition as the products obtained in Examples 1 to 5.

Examples 1 to 3 are examples in which precursors were manufactured using, respectively, the hydrothermal synthe- The results in Table 2 further indicate that the evaluation cells manufactured by using the products of Examples 1, 4, and 5 obtained by performing calcination in an atmosphere with an oxygen concentration of 5% to 15% have more excellent rate properties and a higher discharge capacity, as compared to the evaluation cell manufactured by using the product of Comparative example 3 obtained by performing calcination in an atmosphere with an oxygen concentration of 18%. This is considered due to the fact that in Comparative example 3, the oxygen concentration in the calcination atmosphere was too high, therefore the organic compound in the precursor was oxidized to form carbon dioxide during the calcination and so had not remained but lost, and thus the effect of improving electron conductivity was not attained. This fact can be confirmed by the fact that the product obtained in Comparative example 3 had no carbon-including phase, as shown in Table 1.

In Example 6, the mole ratio of iron (Fe) in the mixed solution of the starting materials was made higher than that of Example 1. As a result, as shown in Table 1, the iron content of the product obtained in Example 6 was higher than that of the product obtained in Example 1. The results in Table 2 indicate that the evaluation cell of Example 6 manufactured by using the product obtained in Example 6 has rate properties superior to the evaluation cell of Comparative example 1, similarly to the evaluation cell of Example 1.

Examples 7 to 14 are examples where compounds including elements M other than iron (Fe) were used. As shown in Table 1, the products obtained in Examples 7 to 14 include particles of composite oxides represented by the general formula $Ti_{1\pm x}Nb_{2\pm y}M_zO_{7-\delta}$ (M is at least one element selected from the group consisting of Mg, Ni, Co, W, Ta, and Mo, and each subscript satisfies $0 \leq x \leq 0.15$, $0 \leq y \leq 0.3$, $0.01 < z \leq 0.2$, and $0 < \delta < 0.3$). The results in Table 2 indicate that the evaluation cells of Examples 7 to 14 manufactured using these products exhibit rate properties superior to those of the evaluation cell of Comparative example 1, similarly to the evaluation cells of Examples 1 to 3 and 6 manufactured by using iron as the element M.

Specifically, the products obtained in Examples 7 and 8 included composite oxides in which the Ni content was 0.05 and 0.01 in the above general formula. Nickel (Ni) serves as a carbonization catalyst during the calcination, similarly to Iron (Fe). Thus, in Examples 7 and 8, the organic compound included in the precursor was carbonized to from a carbon-including phase during the calcination and remained in a state of being attached to the surface the compound oxide particles. This fact can be confirmed from the results shown in Table 1. As a result, the evaluation cells of Examples 7 and 8 had exhibited a high discharge capacity and excellent rate properties. This result shows that even in the case where an Ni-including compound is used as a starting material, such that the Ni content would be 0.01 in the above general formula, it is possible to obtain a product having sufficient charge and discharge properties. Examples 9 to 11 are examples where Co, Mg or W was used as the element M. The results in Table 2 indicate that the evaluation cells of Examples 9 to 11 manufactured using the products obtained in Examples 9 to 11 had exhibited a high discharge capacity and excellent rate properties, similarly to Examples 1, 7, and 8 which are manufactured using the product obtained by using Fe or Ni as the element M. Example 12 is an example where Ta was used as the element M and the mole ratio of the elements in the mixed solution of the starting materials was adjusted such that the Nb content in the general formula would be lower than 2. The results in Table 2 indicate that the evaluation cell of Example 12 manufactured by using the product of Example 12 had exhibited a high discharge capacity and excellent rate properties. Examples 13 and 14 are examples where Mo was used as the element M and the mole ratio of the elements in the mixed solution of the starting materials were adjusted such that the Ti content in the general formula would be higher than 1. The results in Table 2 indicate that the evaluation cells of Examples 13 and 14 manufactured using the products obtained in Examples 13 and 14 had exhibited improved charge and discharge properties compared to the evaluation cell of Comparative example 1, similarly to Example 1.

Examples 15 to 17 are examples where other carbon sources were used in place of ascorbic acid of Example 1. These results for these examples indicate that the evaluation cells of Example 1 and Examples 15 to 17 had exhibited rate properties and cycle properties superior to those of the evaluation cell of Comparative example 1 regardless of the material used as the carbon source. In particular, the evaluation cell of Example 15 manufactured using the product of Example 15 obtained by using sucrose as the carbon source had exhibited particularly excellent cycle properties. Example 17 is an example where acetylene black was used as the carbon source. It is considered that in the produced obtained in Example 17, the presence of acetylene black allowed for suppression of the excessive reduction of niobium and titanium in the calcination process, and furthermore, the carbon-including phase derived from acetylene black further improved the electron conductivity of the active material particles.

Examples 18 and 19 are examples where the sol-gel method was used, similarly to Example 2, but using a starting material different from that of Example 2. The results in Table 2 indicate that the evaluation cells of Examples 18 and 19 had exhibited rate properties superior to those of the evaluation cell of Comparative example 1, similarly to the evaluation cell of Example 2.

Comparative example 4 is an example where a compound including an element M was not used as a starting material. In Comparative example 4, the calcined precursor had no element M and thus niobium and titanium were reduced by the calcination process. As a result, the evaluation cell of Comparative example 4 manufactured using the product obtained in Comparative example 4 was inferior to the evaluation cells of Examples 1 to 19 in either of the discharge capacity at a discharge rate of 25 mA/g and discharge capacity at a discharge rate of 250 mA/g, as shown in Table 2.

Comparative example 5 is an example where a carbon source was not used as a starting material. Accordingly, as shown in Table 1, the product obtained in Comparative example 5 had no carbon-including phase. As a result, the evaluation cell of Comparative example 5 manufactured by using the product obtained in Comparative example 5 had very low rate properties, as shown in Table 2.

According to one or more of the above embodiments and examples, there is provided a method of manufacturing an active material for batteries including particles of a composite oxide represented by the general formula $Ti_{1\pm x}Nb_{2\pm y}M_zO_{7-\delta}$ and a carbon-including phase formed on the surface of the particles of composite oxide. The manufacturing method includes preparing a mixture by mixing in a liquid a compound including Ti, a compound including Nb, a carbon source, and a compound including an element M, obtaining a precursor from the mixture, and calcining the precursor. The precursor includes Ti, Nb, M, C, and O. The calcination of the precursor is performed in a mixed atmosphere including nitrogen and oxygen, or argon and oxygen, with an oxygen concentration of 5% to 15%. According to the manufacturing method according to the embodiment, it is possible to produce an active material for batteries including particles of composite oxide $Ti_2NbO_7$ coated with carbon while suppressing the reduction of titanium (Ti) and niobium (Nb) by performing calcination once.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing an active material including particles of a composite oxide represented by a general formula $Ti_{1\pm x}Nb_{2\pm y}M_zO_{7-\delta}$ (M is at least one element selected from the group consisting of Mg, Fe, Ni, Co, W, Ta, and Mo, and each subscript satisfies $0 \le x \le 0.15$, $0 \le y \le 0.3$, $0.01 < z \le 0.2$, and $0 < \delta < 0.3$) and a carbon-including phase formed on the surface of the particles, the method comprising:

preparing a mixture by mixing in a liquid, a compound including Ti, a compound including Nb, a carbon source, and a compound including the element M;

obtaining a precursor including Ti, Nb, M, C, and O from the mixture; and calcining the precursor in a mixed atmosphere including nitrogen and oxygen, or argon and oxygen, where an oxygen concentration of the mixed atmosphere is 5% to 15%.

2. The method of manufacturing an active material according to claim 1, wherein the liquid includes water, alcohol, or a mixture of water and alcohol.

3. The method of manufacturing an active material according to claim 1, wherein the precursor is obtained by adjusting a pH of the mixture to alkaline pH, taking out from the liquid a precipitate formed as a result of adjusting the pH of the mixture, and drying the precipitate.

4. The method of manufacturing an active material according to claim 1, wherein the precursor is obtained by gelling the mixture and heating a resulting gel-form compound at a temperature of from 300° C. to 500° C.

5. The method of manufacturing an active material according to claim 1, wherein the mixture is obtained by mixing the compound including Ti, the compound including Nb, the carbon source, the compound including an element M, and water in an autoclave, and the precursor is obtained by heating the mixture in the autoclave at a temperature of from 110° C. to 240° C.

6. The method of manufacturing an active material according to claim 1, wherein the calcination temperature of the precursor is in a range of from 800° C. to 1000° C.

7. A method of manufacturing an active material according to claim 1, wherein the carbon source is an organic compound including a COOA group, wherein A is selected from the group consisting of H, Li, and Na.

8. The method of manufacturing an active material according to claim 1, wherein the carbon source is carbon black.

9. The method of manufacturing an active material according to claim 1, wherein the compound including an element M is selected from the group consisting of acetate, nitrate, sulfate, chloride, oxide, and hydroxide of the element M.

10. The method of manufacturing an active material according to claim 1, wherein the element M is Fe.

11. The method of manufacturing an active material according to claim 1, wherein the element M is Mo or Ta.

12. The method of manufacturing an active material according to claim 1, wherein the active material is an active material for batteries.

* * * * *